XR 3,569,996

[11] 3,569,996

[72] Inventors James E. Goell
Middletown;
William M. Hubbard, Middletown
Township, Monmouth County, N.J.
[21] Appl. No. 735,216
[22] Filed June 7, 1968
[45] Patented Mar. 9, 1971
[73] Assignee Bell Telephone Laboratories, Incorporated
Murray Hill, Berkeley Heights, N.J.

[54] OPTICAL HETERODYNE RECEIVER WITH PULSE WIDENING OR STRETCHING
10 Claims, 4 Drawing Figs.

[52] U.S. Cl. .......... 250/199, 307/88.3, 356/106, 356/112
[51] Int. Cl. .......... H04b 9/00
[50] Field of Search .......... 250/199; 350/169—174; 307/88.3; 331/94.5; 356/106, 112

[56] References Cited
UNITED STATES PATENTS
2,721,259 10/1955 Krasno .......... 250/199
3,482,099 12/1969 Goodwin .......... 250/199

*Primary Examiner*—Robert L. Griffin
*Assistant Examiner*—Albert J. Mayer
*Attorneys*—R. J. Guenther and Arthur J. Torsiglieri

ABSTRACT: In the optical heterodyne receivers disclosed, the overall signal-to-noise ratio is improved by widening in terms of time duration the information-modulated optical pulses so that their bandwidth is comparable to the bandwidth of the detector. In particular, multiple reflection widening techniques are disclosed. Balanced detection with pulse widening in each path is also disclosed.

INENTORS J. E. GOELL
W. M. HUBBARD

BY Wilford L Wisner

ATTORNEY

OPTICAL HETERODYNE RECEIVER WITH PULSE WIDENING OR STRETCHING

BACKGROUND OF THE INVENTION

In the optical heterodyne receiver art, which is being rapidly developed to fulfill future communication needs, much of the effort has been directed to pulsed communication systems because it presently appears that such systems can make the best use of the theoretically available bandwidth of an optical communication system. In such a system, the optical pulses employed should be as short as possible if one wishes to use the available optical bandwidth as fully as possible. Typically, a large number of communication channels would be provided by interleaving the narrow pulses.

In general, receiving techniques for this sort of a communication system have not been developed in great detail. One of the difficulties which arises is that realizable intermediate frequency and baseband circuits have bandwidths which are much narrower than the bandwidth of the received optical pulses. Indeed, the bandwidth of the pulse, or the frequency spectrum contained within it, is approximately inversely related to the pulse width.

Our analysis shows that, in many such optical receivers, the principal source of noise will be the noise produced by the amplifiers subsequent to detection. In such systems, the narrowband detector and following amplifier throw away received signal power in such a way that the overall signal-to-noise ratio of the receiver may be extremely poor. Accordingly, it is desirable to improve the overall signal-to-noise ratio of optical heterodyne receivers.

SUMMARY OF THE INVENTION

According to our invention, we have recognized that improved heterodyne reception for modulated optical pulses may be achieved by widening or stretching the optical pulses in terms of time duration. The pulse widening is accomplished by multiple reflections of the optical pulses and is adapted to make the frequency bandwidth of the widened pulses substantially equal to the bandwidth of the following circuitry.

According to one feature of our invention, the optical pulses are combined with optical local oscillator pulses before multiple reflection pulse widening; and the multiple reflection arrangements are adapted to transmit portions of the combined pulses in successive delay intervals which are integral multiples of the difference frequency period. Preferably, each portion of the output signal pulse contains a few cycles of the difference frequency. A reduction in the required bandwidth is obtained.

According to specific features of our invention, the pulse widening is done in an appropriately adjusted interferometer or a prism adapted for efficient optical input, multiple internal reflections and for partially transmissive optical output. In one embodiment, a Fabry-Perot type of interferometer is provided with a pair of parallel reflectors, one having high reflectivity and an aperture for oblique input of the combined optical pulses and the other having graded, partially transmissive reflectivity. The spacing of the reflectors is adjusted to provide the delay intervals defined above.

BRIEF DESCRIPTION OF THE DRAWING

Further features and advantages of our invention will become apparent from the following detailed description, taken together with the drawing, in which.

DESCRIPTION OF ILLUSTRATIVE EMBODIMENTS

Figure 1:
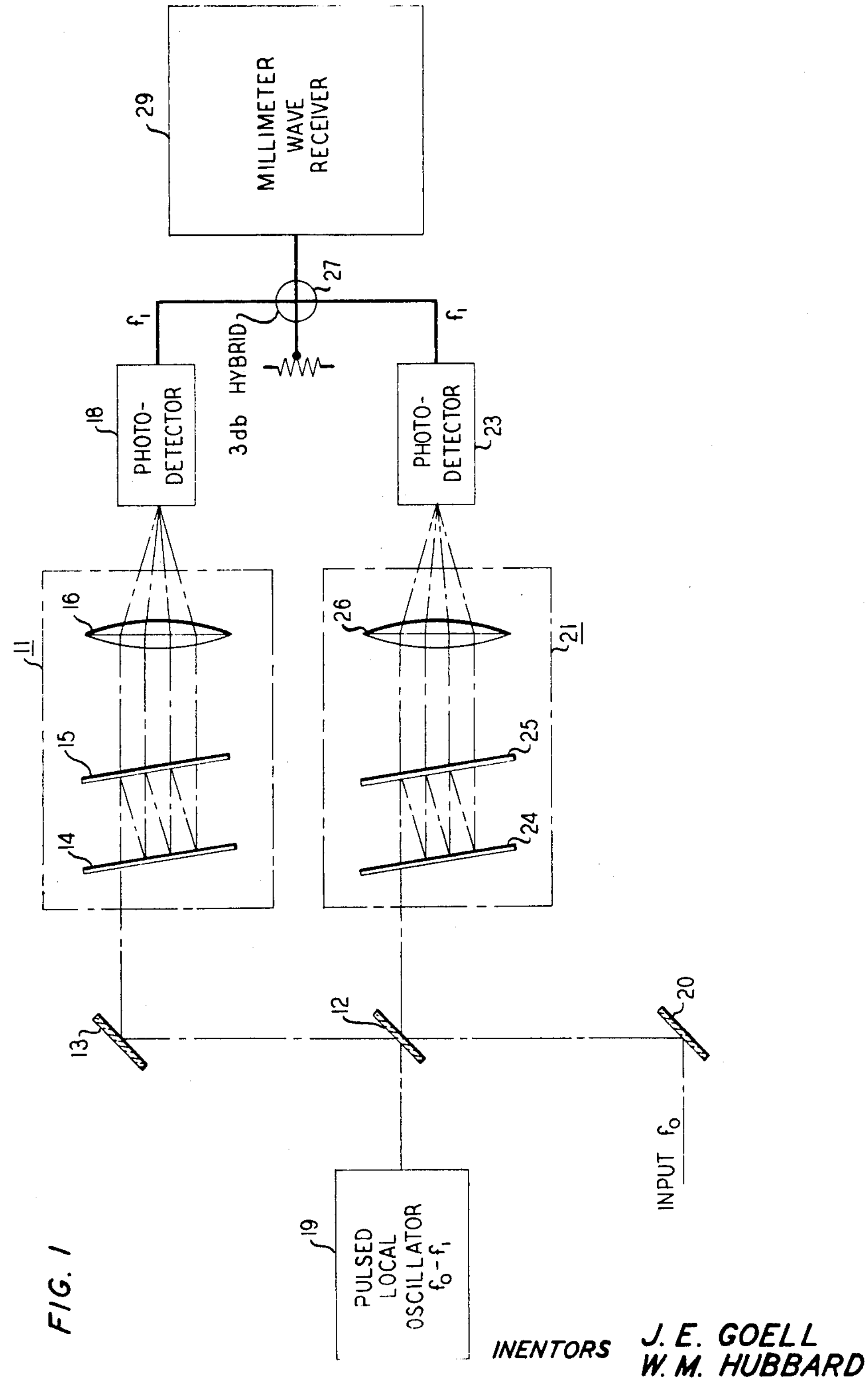
FIG. 1 is a partially pictorial and partially block diagrammatic illustration of a first illustrative embodiment of the invention employing a Fabry-Perot type of interferometer.

The illustrative embodiment of FIG. 1 is a heterodyne receiver for modulated optical pulses of center frequency, or carrier frequency, designated in the drawing as $f_0$. A heterodyne receiver is a receiver in a communication system in which the frequency of the incoming modulated radiation is converted to another, typically lower, frequency before detection. The conversion to a lower frequency, which is typically called down conversion, permits one advantageously to use a powerful local source at a frequency different from that of the received wave in order to produce a replica of the original signal at a lower center frequency. The principal advantage of this is that the signal can be amplified by means of radio frequency or microwave amplifiers prior to detection.

Optical pulses are pulses of electromagnetic radiation having a wavelength shorter than about 100 microns. This wavelength corresponds to a frequency about 3,000 gigahertz. One gigahertz equals $10^9$ cycles per second. The frequency ranges which lie below the optical range may be defined as follows: the submillimeter wave region—300 to 3,000 gigahertz; the millimeter wave region—30 to 300 gigahertz; the microwave region—1 to 30 gigahertz. Pulse widening or stretching is the increase of the time duration of the pulse. Time duration is usually called pulse length or pulse width.

With the foregoing fundamentals in mind, the illustrative embodiment of FIG. 1 is simply described as follows: the received modulated optical pulses of frequency $f_0$, which comprise the input for the receiver of FIG. 1, are combined with relatively powerful optical pulses of like width and of frequency $f_0$–$f_1$ at the partially transmissive reflector 12 and applied to the multiple reflection pulse stretchers 11 and 21. The partially transmissive reflector 12 is constructed such that it transmits half of the optical power incident upon it and reflects the other half. Such a device functions as a 3 db. hybrid; therefore, half of the signal power is transmitted to multiple reflection pulse stretcher 11 and the other half to pulse stretcher 21. In the same way, the energy from the pulse local oscillator is divided equally among the two multiple reflection pulse stretchers by means of the partially transmissive reflector 12. The pulses local oscillator 19 is synchronized such that the pulses from it coincide precisely with the signal pulses when they are combined at the partially transmissive reflector 12.

The combined optical pulses entering pulse stretcher 11 are obliquely injected into a Fabry-Perot type of interferometer comprising parallel reflectors 14 and 15 through an appropriate transmissive area of reflector 14, which is otherwise highly reflective. The reflector 15 is graded in reflectivity in steps from a highest reflectivity at the first area of incidence of the combined pulses (still permitting a small percentage of transmission of light intensity of the pulse) to essentially zero reflectivity at the last area of incidence of the combined pulses. Correspondingly, the transmissivity of reflector 15 varies in steps to compensate for the gradual decreasing intensity of the reflected portion of the combined pulses in the interferometer. Specifically, the stepped increase in transmissivity provides that adjacent portions of the transmitted combined pulses have equal intensities, or that they vary according to some prescribed rule such as, for example, the square of the cosine of the respective accumulated fractions of the total time delay of the interferometer. Calculation and implementation of the reflectivity and transmissivity steps of reflector 15 are within the skill of those persons having ordinary skill in either the optics art or the optical communication device art. The relative delay, $\tau$, between adjacent portions of the transmitted combined pulses is given by $$C\tau = 2d\cos\theta \qquad (1)$$

where $C$ = velocity of light $d$ = separation of reflectors 14 and 15

$\theta$ = angle between the beam of the incident combined light pulses and the normal direction with respect to reflectors 14 and 15. All these quantities should be compatible units. The angle $\theta$ is the angle between the reflected portion of the beam and the normal at each reflection. It is taken just large enough to keep the different transmitted portions of the combined pulses from overlapping and thus to allow the reflectivity of reflector 15 to be made different for the reflected light at each succeeding incidence. The reflectors 24 and 25 in interferometer 21 are like reflectors 14 and 15, respectively.

The signal frequency $f_0$ and the local oscillator frequency $f_0 - f_1$ are chosen to make the difference frequency $f_1$ sufficiently large so that a few cycles of this difference frequency fit into the relative delay time $\tau$. Also, the difference frequency $f_1$ (intermediate frequency) is chosen as an integral multiple of $l/\tau$, the reciprocal of the delay. The delay, $\tau$, is then an integral multiple of a desired difference frequency period, $1/f_1$. If $f_1$ is already fixed, $\tau$ may be chosen to satisfy the foregoing relationship by adjusting the interferometer spacing $d$ or the angle, $\theta$.

The combined pulses transmitted through various portions of reflector 15 are collected and focused by lens 16 so that they form one stretched pulse. This stretched pulse, in which the modulated difference frequency component is a continuous wave, is illustratively applied to an optical mixer or photodetector 18. Similarly, the combined pulses transmitted through various portions of reflector 25 are focused by lens 26 so that they also form one stretched pulse, which is then applied to an optical mixer or photodetector 23. The outputs of the optical mixers (or photodetectors) 18 and 23 are combined in a 3 db. hybrid 27. The millimeter wave pulsed from hybrid 27 are further down-converted in a heterodyne millimeter wave receiver 29.

In principle, it is not necessary to use the balanced scheme employing two multiple reflection pulse stretchers and two photodetectors as described above and assumed in FIG. 1. However, if a single such device is used, considerable amplitude modulation from the pulse local oscillator source will probably result at the detector even in the absence of a signal pulse. The phase relationships inherent in the optical splitter 12 and the 3 db. hybrid 27 are such that this undesirable amplitude modulation is cancelled by means of the balanced arrangement shown in FIG. 1.

In those time slots which contain no light pulses in the input signal, there will be no baseband pulse coming from the detector. In those time slots which contain an optical input signal pulse, there will be a pulse from the detector. The original input signal is therefore converted from a sequence of very narrow optical pulses to an identical sequence of comparatively very wide baseband pulses.

It should be noted that the bandwidth of the millimeter wave receiver 29 and indeed the value of the frequency $f_1$, may be substantially less than the bandwidth of the received pulses at frequency $f_0$. In referring to the bandwidth of the received pulse, we mean the frequency spectrum inherent therein. Thus, without the pulse widening accomplished in multiple reflection pulse stretchers 11 and 21, much information would be irretrievably lost in receiver 29 because of its relatively low output frequency and output bandwidth.

The received modulated optical pulses could typically be produced in a transmitter employing a suitable laser such as a neodymium YAG laser (yttrium aluminum garnet host) operating upon the 1.06-micron transition of the neodymium ion. The laser is illustratively internally modulated at a 500-megahertz rate to enhance mode locking and thus generate short pulses. The transmitter would further include suitable modulators for the 1.06-micron radiation, for example, a lithium tantalate modulator as disclosed in the copending patent application of A.A. Ballman et al., Ser. No. 615,811, now U.S. Pat. No. 3,506,929 filed Feb. 13, 1967, and assigned to the assignee hereof.

The local source 19 may be a suitable laser. It could be the neodymium laser at 1.06 microns applied to suitable optical frequency shifting devices, assuming the transmitted signal was generated by modulating a 1.06-micron neodymium laser beam. For example, the frequency shifter could be acousto-optic diffraction grating type frequency shifters of the general type shown in P.K. Tien U.S. Pat. No. 3,174,044, operated with constant acoustic input frequencies and amplitudes. Source 19 also could be provided by shifting the frequencies obtained from a neodymium 1.06-micron laser with the optical frequency shifter disclosed in the copending patent application of M.A. Dugay, Ser. No. 586,153, filed Oct. 12, 1966, and assigned to the assignee hereof.

Photodetectors 18 and 23 are germanium diode photodetectors having junction capacitances as low as possible.

The 3 db. hybrid 27 is a conventional millimeter wave hybrid of any of the types now widely commercially available.

The millimeter-wave receiver 29 is illustratively of conventional type and could be of the type disclosed in sections 3.4 and 3.7 of our article with Messrs. Warters, Standley, Mandeville, Lee, Shaw and Clauser in the Bell System Technical Journal, 46, 1977 (Nov., 1967).

Further details of the embodiment of FIG. 1 are as follows. The signal input to multiple reflection pulse stretchers 11 and 21 is illustratively a binary optical signal consisting of a pulse or no pulse of optical energy in each of a series of time slots characteristic of the remote transmitter. Such a signal input is merely illustrative, since it could also be, for example, a more complex signal such as would be received in a polarization modulation system in which the two signal states have been separated into two paths. The multiple reflection pulse stretchers 11 and 21 widen the narrow combined optical pulses while providing that the widened pulses are essentially flat topped (or of other suitable shape, e.g., cosine-squared shape). The inherent bandwidth of the pulses is thereby reduced.

The lenses in pulse stretchers 11 and 21 focus the widened pulses upon the photodetectors 18 and 23, which then efficiently generate a millimeter-wave intermediate frequency signal.

It should be noted that the information content of the signal at frequency $f_1$ is still contained in the presence or absence of a pulse.

The output pulses of hybrid 27 are millimeter-wave pulses of frequency $fd$ l. The inherent bandwidth of these pulses, as determined by their width, is within the bandwidth of receiver 29.

It may be noted that the multiple reflection widening of the pulses in the embodiment of FIG. 1 is equivalent to a compression of their bandwidth. In other words, the spectrum of the frequency components has been reduced.

It should be apparent that there are many other ways of performing the multiple reflection pulse widening achieved in the embodiment of FIG. 1. Such a modified embodiment is shown in FIG. 2.

Figure 2:
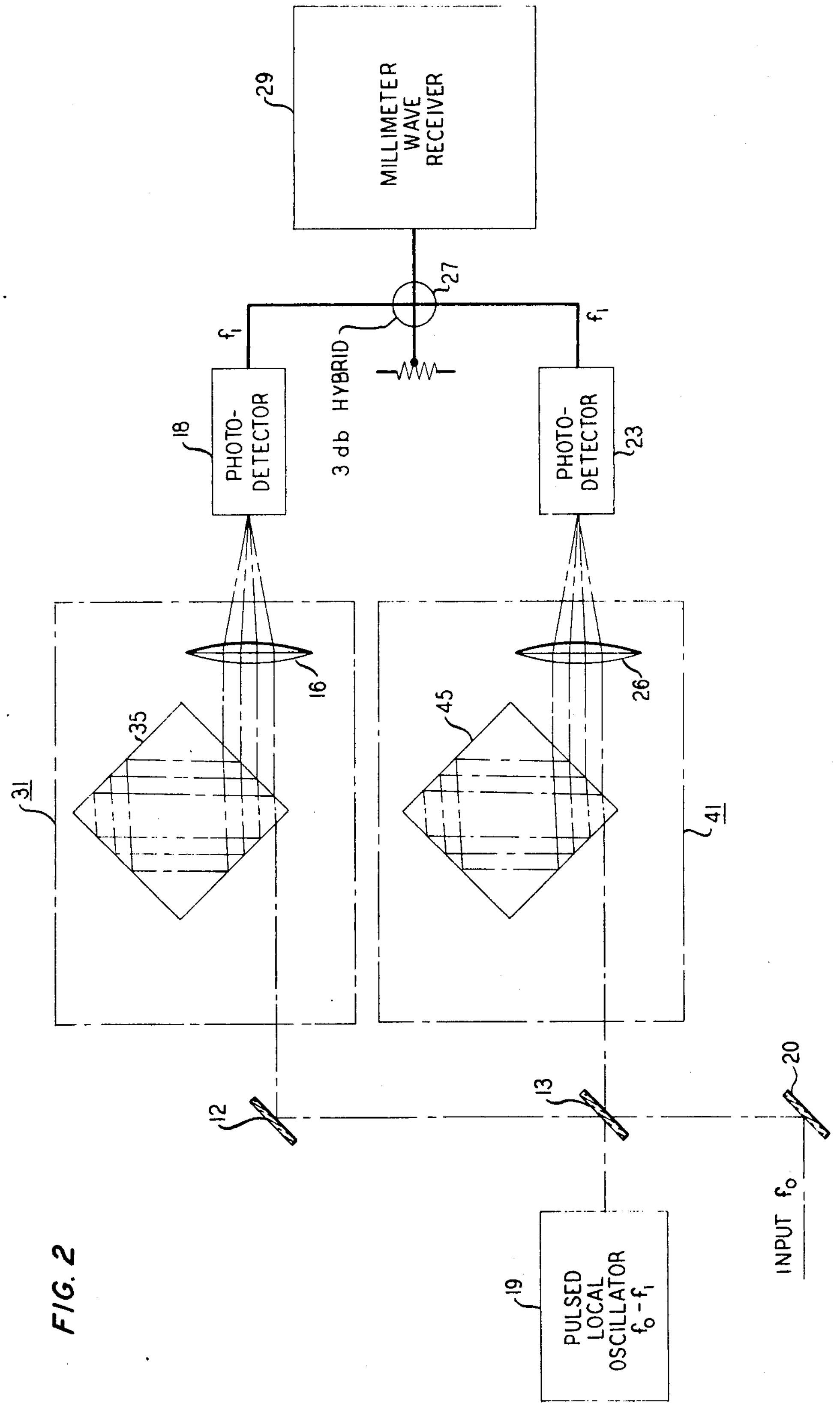
FIG. 2 is a partially pictorial and partially block diagrammatic illustration of a second illustrative embodiment of the invention in which multiple reflection prisms are used.

In the embodiment of FIG. 2, components like those of FIG. 1 are numbered the same; and components analogous to but different from those of FIG. 1 are numbered 20 digits higher than those in FIG. 1. Multiple reflection pulse stretchers 31 and 41 are similar in principle to those shown in FIG. 1 as pulse stretchers 11 and 21. It may be noted that there are a virtually unlimited number of ways in which to mix optical pulse frequencies to obtain the desired intermediate frequency $f_1$.

The principal difference between the embodiment of FIG. 2 and the embodiment of FIG. 1 is the specific form of multiple reflection pulse stretchers 31 and 41. The pulse stretchers 31 and 41 are alike in details; their balanced arrangement balances out spurious amplitude modulation, as in FIG. 1.

The prisms 35 and 45 are illustratively quartz prisms which are rectangular parallelopipeds of square cross section in the plane of the paper. The surfaces of the prisms are reflectively coated at the light wavelengths employed, except as follows. Each entrance surface is provided with a region of low reflectivity through which the beam is injected at an angle slightly away from 45° (e.g., 46°) respect to the surface normal in the plane of the paper and, preferably, also at a small angle (e.g., 1 °,) with respect to the surface normal in a direction orthogonal to the plane of the paper. Although the spatial spreading of the output beam is seen only in the plane of the paper, the foregoing adaptation provides like spreading orthogonal to the plane of the paper and facilitates focusing of the output beams by lenses 36 and 46. In addition, the exit surface of each prism is provided with reflectivity graded in steps like those of reflectors 15 and 25 of FIG. 1, except that the steps occur in a square array in a plane normal to the paper and their particular order or sequence in each direction depends on the angles of injection of the beams. In any event, their order is a function of the pattern of multiple reflections in prisms 35 and 45 and may be readily determined by geometrical ray optics.

It can be shown that beams properly injected into a regular polyhedral prism, such as a cube, of the above-described type will be multiple reflected within the prism so that all round trips have equal duration and so that the magnitude of the angle of incidence at any surface is the same for all transversals. As a result of the equal time delays, the desired pulse widening is obtained and the repetitive array of positions provides the desired pulse shape.

Our analysis indicates that substantially equal time delay intervals should be obtainable with polyhedral prisms having shapes other than regular polyhedra. Irregularity in the pattern of output positions, to the extent not desired for pulse shaping can be compensated by external optical elements.

It should also be apparent that one could employ a one-dimensional array of output beam positions merely by injecting the beam into the prism in a plane normal to the entrance surface. Such a plane would be the plane of the paper, as seen in FIG. 2.

It would also be noted that some surprising scanning sequences can be generated in the embodiment of FIG. 2 merely by choosing larger angles of injection. Since a relatively compact array of positions typically results, these versions are readily usable for the purposes of our invention.

As in the embodiment of FIG. 1, the relative time delay, $\tau$, between emitted portions of the combined pulses must be an integral multiple of the period, $1/f_1$, of the difference frequency $f_1$.

Except for the differences in the arrangement and internal operation of multiple reflection pulse stretchers 31 and 41, the operation of the embodiment of FIG. 2 is essentially like the operation of the embodiment of FIG. 1.

Figure 3:
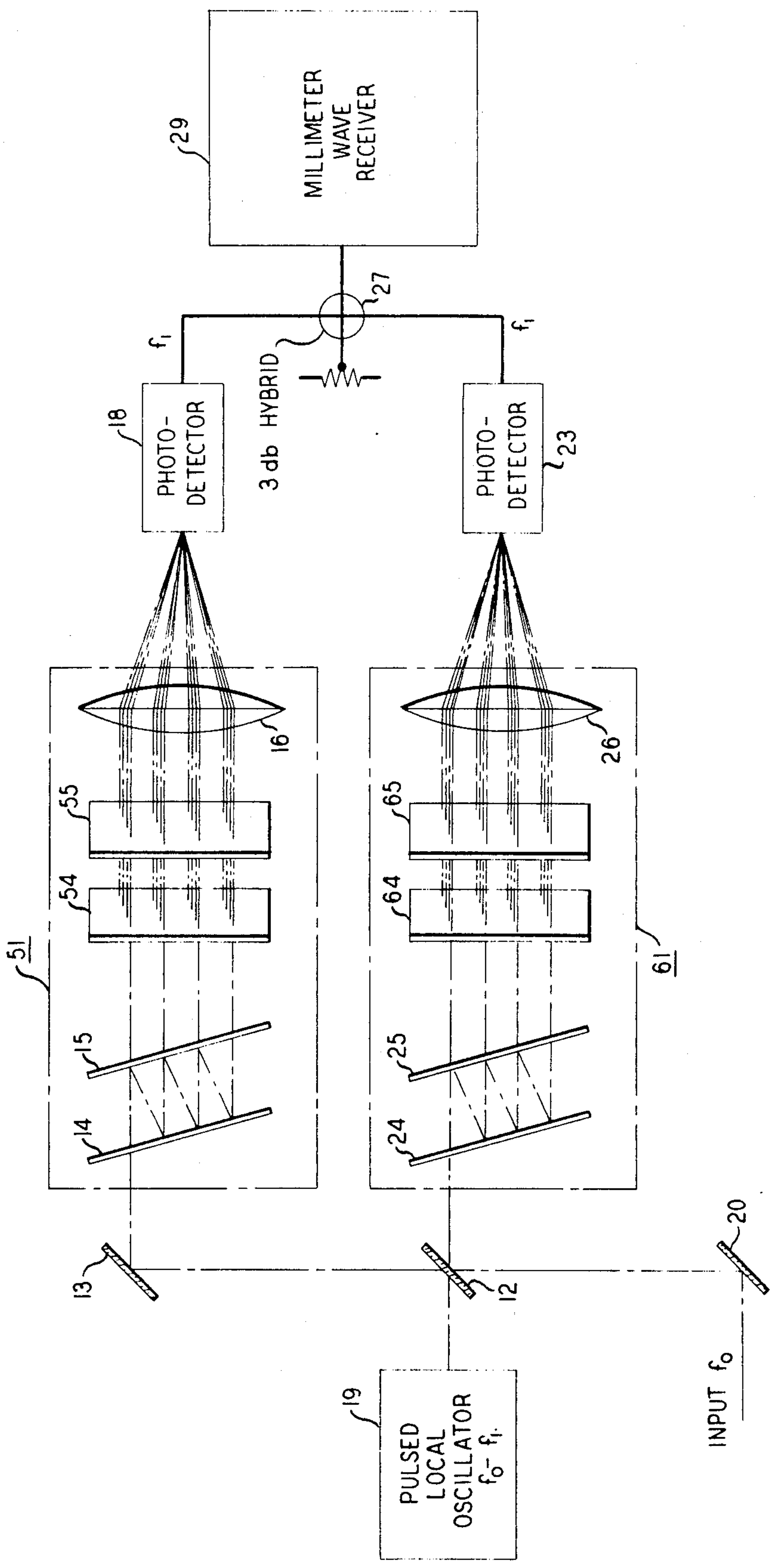
FIG. 3 is a partially pictorial and partially block diagrammatic illustration of a modification of the embodiment of FIG. 1 for multiple reflection pulse widening in three dimensions.

In the embodiment of FIG. 3, the embodiment of FIG. 1 is modified to spread the beams of combined pulses in both of two directions mutually orthogonal to the overall direction of propagation. For the same amount of pulse widening in terms of time duration, much less spatial spreading in any one coordinate is required. Consequently, the lenses 16 and 26 can do a more effective job of focusing the widened beams on photodetectors 18 and 23.

This desirable result is achieved by a pair of interferometers in each of pulse stretchers 51 and 61. With respect to the beam path in each, the second interferometer 54 and 55 (or 64 and 65) is tilted in a coordinate orthogonal to the coordinate in which the first interferometer is tilted. Thus, each of the respective delayed portions of the beams from the first interferometer are split into a plurality of portions which incur different delays in the second interferometer. The spreading in a spatial sense occurs in a direction orthogonal to the initial direction of spatial spreading.

Now consider the delay incurred by that fraction of the beam that incurred the greatest delay in the first interferometer and the greatest delay in the second interferometer. It is clear that the total delay is additive and yields the desired pulse widening. Nevertheless, the beam of the widened pulse now has a more compact, square cross section than in FIG. 1 and is more easily focused by the following lens that is the ribbonlike beam cross section of FIG. 1. Except for the direction of tilt, reflectors 54, 55, 64, and 65 are like reflectors 14, 15, 24 and 25, respectively.

Figure 4:
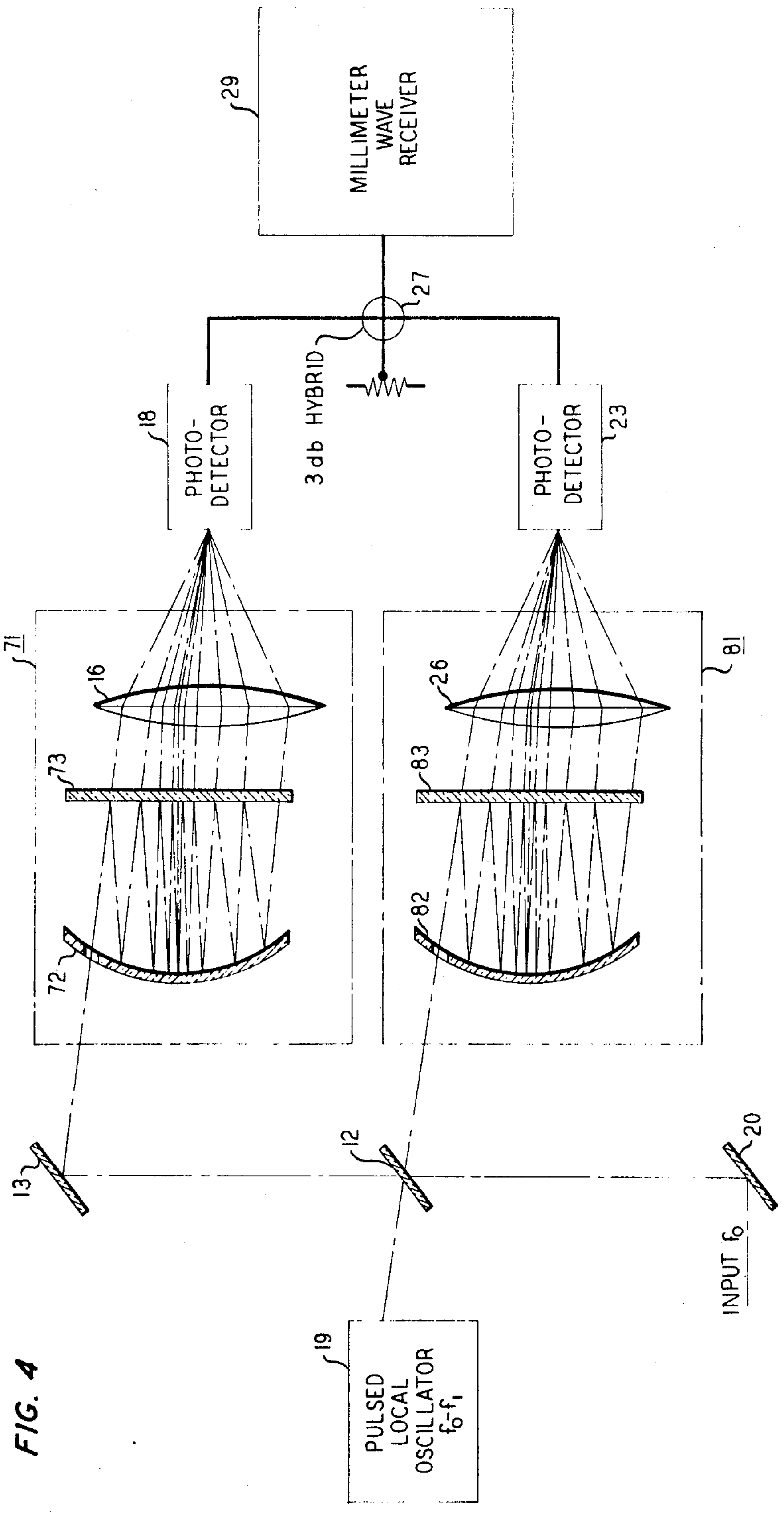
FIG. 4 is a partially pictorial and partially block diagrammatic illustration of another modification of the embodiment of FIG. 1 employing a focusing interferometer for multiple reflection pulse widening in three dimensions.

In the embodiment of FIG. 4, the overall result of the embodiment of FIG. 3 (compact beam cross section for the widened pulses) is achieved by a single focusing interferometer in each of the pulse stretchers 71 and 81. Illustratively, the focusing interferometers respectively include one spherically curved reflector 72, 82 and one partially transmissive reflectivity stepped planar reflector 73, 83. The reflectors of each interferometer are approximately semiconfocally spaced; that is they are spaced by approximately half the radius of curvature of the curved reflector.

The two input beams including combined signal pulses and coincident local oscillator pulses are injected through suitable apertures into the interferometers in a direction slightly skew with respect to the axis of the interferometer. For example, this direction can be chosen so that the closest approach of the mutually skew paths segments of the beam have their closest approach near the middle of the interferometer. This relationship provides output beam portions through each different reflectivity portion of the planar reflector 73, 83 that are most readily focused by the following lenses. Greater focusing problems appear to be encountered if both reflectors of each interferometer are spherically curved. Nevertheless, such a modified embodiment is feasible.

The reflectivity steps of planar reflectors 73, 83 are arranged essentially in one or more circles and in the same sequence as the successive points of incidence of the multiply reflected beam. For the preferred embodiment, successive points of incidence are separated by slightly less than 180° around a circle. The input direction and the reflectivity steps are chosen accordingly. The exact values of the reflectivity steps and the incremental time delays for different beam portions can be essentially the same as in the embodiment of FIG. 1.

In operation, the interferometers 71, 81 provide the desired widening of the combined pulses of both beams of the balanced arrangement. Therefore, the pulses received by the photodetectors have a frequency spectrum within the bandwidth of the photodetectors.

The focusing element, 72 (82), of this interferometer allows the use of a much smaller beam of light (for a given amount of pulse widening) and thereby yields further improvement in the compactness of the output beam.

We claim:

1. A receiver for modulated pulses of optical radiation, comprising partially reflective means intercepting said pulses for widening said pulses in terms of time duration, means for down-converting the carrier frequency of said pulses, and means for detecting said pulses at said down converted frequency.

2. A receiver according to claim 1 in which the means for down converting the pulses includes means for combining the received modulated pulses with optical pulses of differing frequency before said modulated pulses are intercepted by the widening means, and means for mixing the combined pulses after widening by said widening means.

3. A receiver according to claim 1 in which the widening means comprises an interferometer adapted for oblique injection of the received modulated pulses, said interferometer having an output reflector of graded reflectivity.

4. A receiver according to claim 3 in which the interferometer is adapted for lateral displacements of portions of the beams in more than one direction.

5. A receiver according to claim 3 in which the angle of injection into the interferometer and the graded reflectivity of the output reflector are mutually adapted to provide a relative delay of adjacent portions of the transmitted optical pulse energy, which delay is equal to an integral multiple of the period of a selected intermediate frequency, the down converting means including a local source of pulses differing in frequency from said received pulses by said intermediate frequency.

6. A receiver according to claim 1 in which the widening means comprises a multiple internal reflection prism having an aperture adapted for admission of the received pulses and for output transmission of only a portion of the pulse energy during each multiple internal reflection circuit of said pulses.

7. A receiver according to claim 6 in which the down converting means includes means for combining the received modulated pulses with optical pulses of a second frequency different from the frequency of the received pulses and in which the dimensions of the prism are adapted to provide a relative delay of different portions of the transmitted optical pulse energy, which delay is equal to an integral multiple of the period of the difference frequency, where the difference frequency is equal to the difference of the received pulse frequency and the second frequency.

8. A receiver according to claim 1 in which the down converting means includes a local pulse source, means for combining pulses from said first local source with the received pulses in first and second paths, the pulse-widening means including first and second multiple reflection pulse stretchers intercepting said combined pulses in said first and second paths, the down converting and detecting means further including balanced means for combining the outputs of said first and second pulse stretchers in a balanced manner, said received pulses and said pulses from said local source having like pulse widths initially.

9. A receiver according to claim 8 in which said first and second pulse stretchers each include a pair of interferometers tilted in mutually orthogonal coordinates.

10. A receiver according to claim 8 in which said first and second pulse stretchers each include an interferometer including a curved reflector and an optical axis, said interferometer being adapted for injection of the combined pulses in a direction that is skew with respect to said optical axis.